US006628613B1

(12) United States Patent
Joung et al.

(10) Patent No.: US 6,628,613 B1
(45) Date of Patent: Sep. 30, 2003

(54) FLOW CONTROL METHOD IN PACKET SWITCHED NETWORK

(75) Inventors: Jinoo Joung, Kyonggi-do (KR); Young-Il Kim, Seoul (KR)

(73) Assignee: Samsung Electronics Co. LTD, Suwon (KR)

(*) Notice: Subject to any disclaimer, the term of this patent is extended or adjusted under 35 U.S.C. 154(b) by 0 days.

(21) Appl. No.: 09/417,168

(22) Filed: Oct. 12, 1999

(30) Foreign Application Priority Data

Oct. 12, 1998 (KR) .......................................... 98-42606
Oct. 12, 1998 (KR) .......................................... 98-42607

(51) Int. Cl.[7] ................................................ H04J 3/02
(52) U.S. Cl. ........................ 370/230; 370/232; 370/236
(58) Field of Search ........................ 375/222; 370/230, 370/232, 235, 236, 412

(56) References Cited

U.S. PATENT DOCUMENTS 5,912,895 A * 6/1999 Terry et al. .................. 375/222
6,167,054 A * 12/2000 Simmons et al. ........... 370/412
6,170,022 B1 * 1/2001 Linville et al. ............. 370/232

FOREIGN PATENT DOCUMENTS

WO     WO 98/09408     3/1998  ........... H04L/12/56

* cited by examiner

*Primary Examiner*—Salvatore Cangialosi
(74) *Attorney, Agent, or Firm*—Cha & Reiter

(57) ABSTRACT

A flow control method in an Ethernet switch being a downstream device using a full duplex mode in a packet switched network of the type having a plurality of input ports connected to a plurality of Ethernet switches being upstream devices and a common memory for storing packet data received from each input port and for transmitting packet data read from the common memory to a destination upstream device. In such flow control method, the buffer state of the common memory is first determined. If the buffer state is buffer-full, a pause frame including a predetermined pause time is transmitted to the plurality of Ethernet switches being upstream devices and an expected pause time of the upstream devices is counted. The buffer state of the common memory is determined again if the expected pause time expires. If the buffer state is buffer-full, the pause frame including the predetermined pause time is re-transmitted to the plurality of Ethernet switches being upstream devices and the expected pause time of the upstream devices is initiated.

20 Claims, 8 Drawing Sheets

FLOW CONTROL METHOD IN PACKET SWITCHED NETWORK

PRIORITY

This application claims priority to an application entitled "Flow Control Method in Packet Switched Network" filed earlier in the Korean Industrial Property Office on Oct. 12, 1998 and assigned Ser. No. 98-42606, and an application entitled "Flow Control Method in Packet Switched Network" filed earlier in the Korean Industrial Property Office on Oct. 12, 1998 and assigned Ser. No. 98-42607, the contents of which are hereby incorporated by reference.

BACKGROUND OF THE INVENTION

1. Field of the Invention

The present invention generally relates to a packet switched network, and in particular, to a flow control method in a LAN (Local Area Network) that can minimize the loss of packet data over the LAN such as Ethernet and allow a bandwidth to be equally shared among the input ports of the LAN device.

2. Description of the Related Art

Congestion condition associated with Ethernet is generally overcome by applying a back pressure or transferring a pause frame in the Ethernet system. The back-pressure is applied when an Ethernet switch is in a half duplex mode, and the pause frame transfer scheme is applied when an Ethernet switch is in a full duplex mode. The pause frame is one form of MAC (Media Access Control) control frames which is defined under the IEEE 802.3x standard. These two schemes control the flow of information and prevent the Ethernet switches from sending packet information temporally to a specific Ethernet switch when the buffer capacity of the specific Ethernet switch reaches its limit or when congestion occurs.

The back-pressure scheme transmits a jamming signal used in the CSMA/CD (Carrier Sense Multiple Access with Collision Detection) method to remedy the congestion condition. Upon sensing the congestion condition from a specific Ethernet switch (downstream), a jamming signal is trasnsmitted to the other Ethernet switches (upstream) within the same segment to stop the packet transmission for a predetermined random back-off period until the congestion condition is cleared.

On the other hand, the pause frame scheme transmits a pause frame, which is one form of MAC control frames defined under the IEEE 802.3x standard, to remedy the congestion condition. If an Ethernet switch (downstream) suffers a congestion, a specific pause frame is transmitted to the other Ethernet switches (upstream) in the same segment so that the other Ethernet switches stop transmitting the packet data for the duration of a pause time period as specified in the pause frame. After the congestion condition is cleared, the transmission of packet data is resumed.

As described in the above, a jamming signal or a pause frame is introduced to compensate for the congestion condition. If the Ethernet switch (downstream, hereinafter referred as "downstream Ethernet switch") suffers congestion, the jamming signal and the pause frame are transmitted to the plurality of Ethernet switches (upstream, hereinafter referred as "upstream Ethernet switches") through the input ports connected to each upstream Ethernet switch. However, the conventional flow control method is likely to stop the packet transmission for all the upstream Ethernet switches even when the packet transmission from the upstream Ethernet switch is not the source of congestion.

SUMMARY OF THE INVENTION

It is, therefore, one of the objects in accordance with the present invention is to provide a method for equally sharing a buffer capacity among the input ports of Ethernet switches.

It is another object of the present invention to provide a method for minimizing the packet loss due to a congestion in the Ethernet switch.

It is a further object of the present invention to provide a method for increasing a packet processing rate over the entire network.

To achieve the above described objects, a method for controlling the flow of traffic in an Ethernet switch, namely, a downstream device using a full duplex mode in the packet switched network of the type having a plurality of input ports coupled to a plurality of upstream Ethernet switches, and a common memory for storing the packet data received from each input port and for transmitting the packet data read from the common memory to the destination upstream Ethernet switch. In such flow control method, the buffer state of the common memory is first determined. If the buffer state is full, a pause frame having a predetermined pause time is transmitted to the plurality of upstream Ethernet switches and an expected pause time of the upstream devices is initiated. Thereafter, if the expected pause time expires, the buffer state of the common memory is determined again. If the buffer state is still full, the pause frame having a predetermined pause time is re-transmitted to the plurality of upstream Ethernet switches and the expected pause time of the upstream devices is re-initiated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. For purpose of clarity, well-known functions or constructions to those having skill in this art are not described in detail since they would obscure the invention in unnecessary detail.

Figure 1:
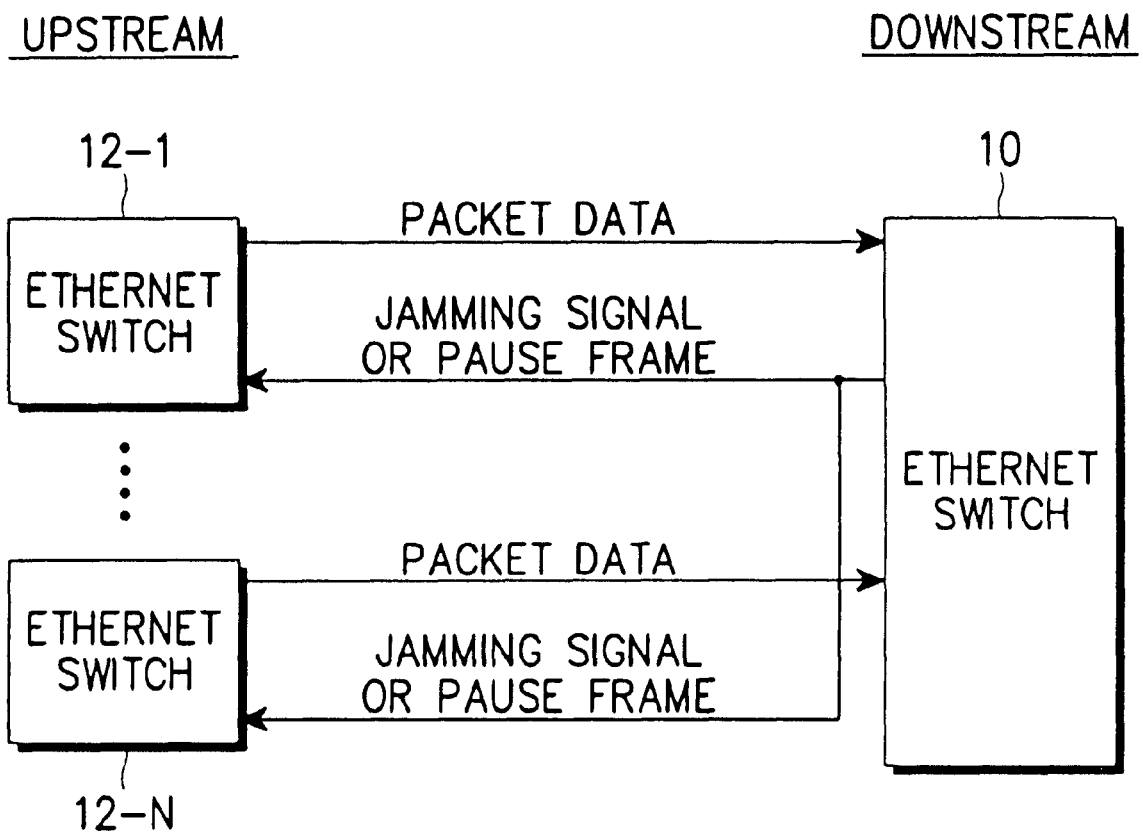
FIG. 1 is a schematic block diagram of a LAN according to the present invention.

FIG. 1 depicts a schematic block diagram of a LAN according to the present invention. A plurality of Ethernet switches (10, 12-1 through 12-N) can be implemented with new LAN devices known as multi-port bridges. FIG. 1 illustrates a plurality of Ethernet switches 12-1 to 12-N for transmitting packet data in upstream (hereinafter referred as "upstream Ethernet switches"), and an Ethernet switch 10 downstream (hereinafter referred as "downstream Ethernet switches") for transmitting a jamming signal in the half duplex mode or transmitting a pause frame in the full duplex mode to the Ethernet switches 12-1 to 12-N in downstream.

Figure 2:
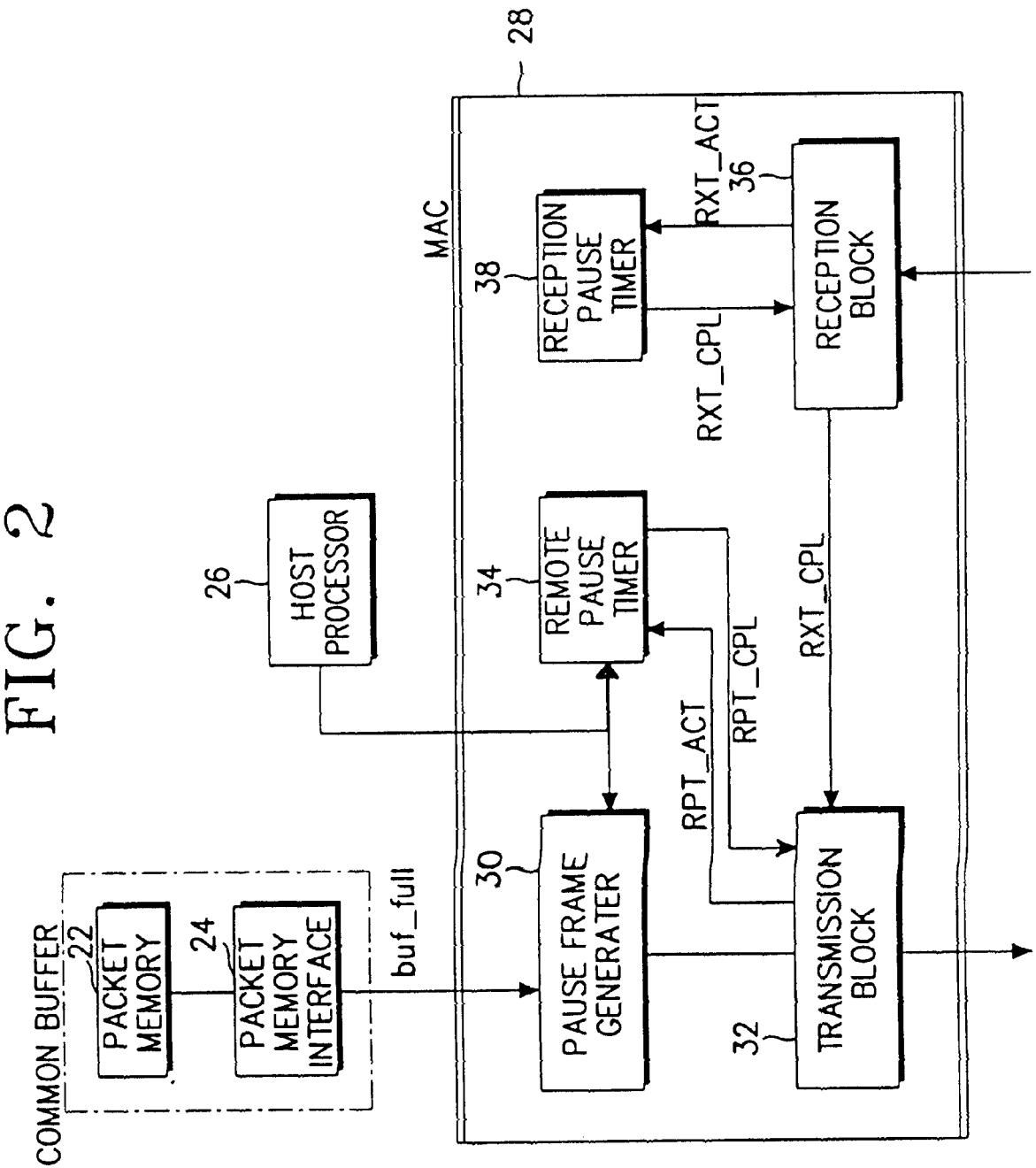
FIG. 2 is a schematic block diagram of an Ethernet switch for both upstream and downstream cases according to the first embodiment of the present invention.
Figure 3:
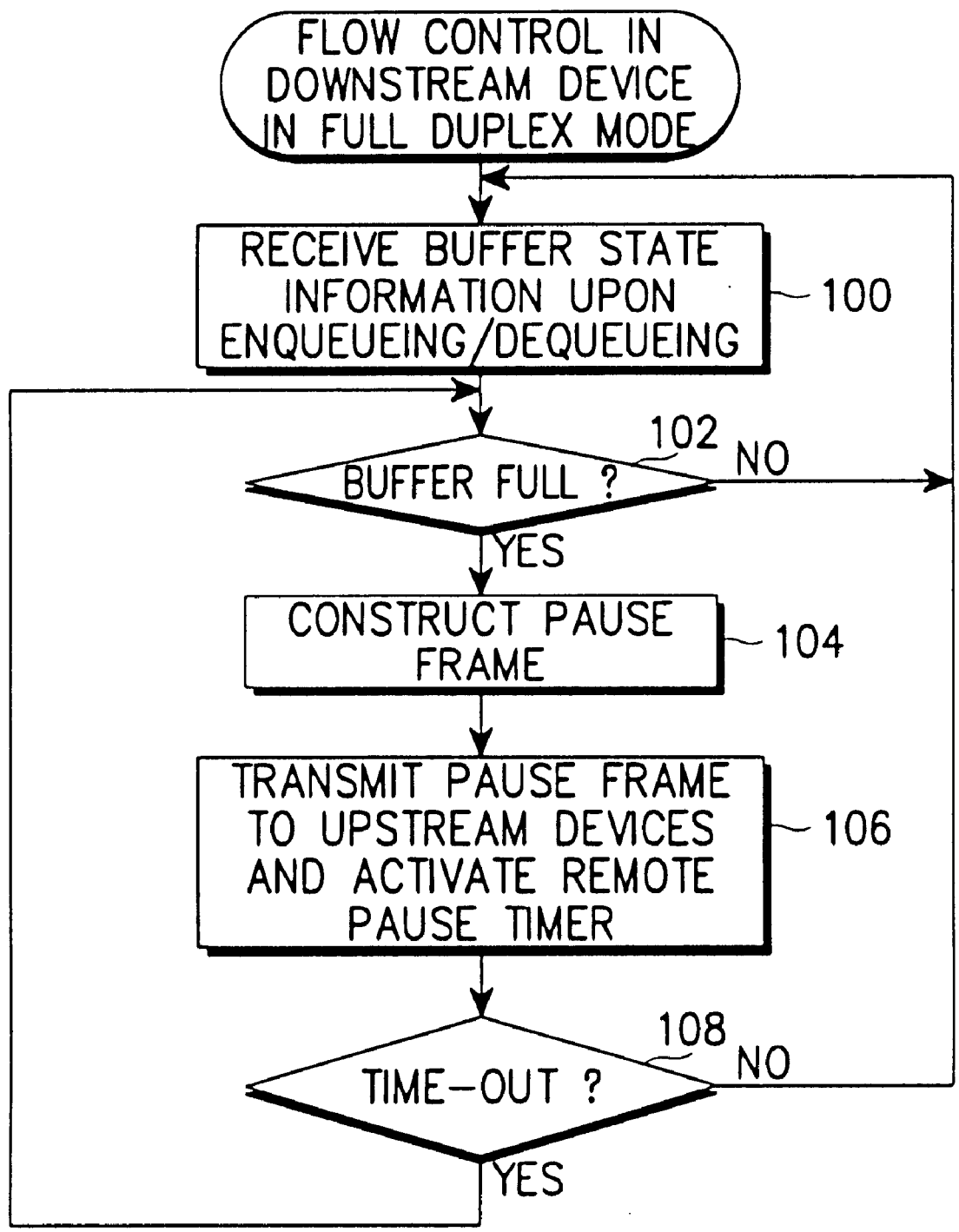
FIG. 3 is a flowchart depicting a flow control operation of an Ethernet switch (downstream) using a full duplex mode according to the first embodiment of the present invention.

FIG. 2 depicts a block diagram of an Ethernet switch illustrating both the upstream and downstream Ethernet switches, which is used for a flow control in the full duplex mode according to a first embodiment of the present invention. That is, the configuration for both upstream and downstream Ethernet switches are the same. FIG. 3 depicts a flowchart illustrating the flow control operation of down stream Ethernet at a full duplex mode according to the first embodiment of the present invention.

Referring to FIG. 2, the Ethernet switch for both downstream and upstream includes a common buffer 20, a host processor 26, and a MAC unit 28. The common buffer 20 includes a packet memory 22 for storing all packet data received via a plurality of input ports of the Ethernet switch, and a packet memory interface 24 for interfacing between the packet memory 22 and the MAC unit 28. According to the first embodiment of the present invention, the packet memory interface 24 includes an up/down counter. The up/down counter counts up/down upon enqueueing/dequeueing the packet data in/from the packet memory 22. That is, the counter counts up when storing the packet data in the memory 22 and counts down when reading the packet data from the memory 22. If a value for the up/down counter reaches a predetermined threshold value, the packet memory interface 24 transmits a signal (buffer_full) to the MAC unit 28, indicating that buffer is full. The count value is compared to the predetermined threshold value at every count up/down operation. The predetermined threshold value is set by an operator of the system to indicate when the packet memory 22 becomes full. The packet memory interface 24 performs the operation of comparing the count value with the predetermined threshold value, and transmits the buff-full signal when the count value exceeds the predetermined threshold value.

The host processor 26 serves to provide various operation signals and status control signals to the MAC unit 28. According to the first embodiment of the present invention, the host processor 26 transmits information about the pause time period, which represents the duration of time for temporarily stopping the transmission of packet data from the plurality of Ethernet switches (12-1 to 12-N) to the downstream Ethernet switch 10, during the initialization state. The initialization state refers to state when the power is on.

The MAC unit 28 is provided for each port of the Ethernet switch for performing the MAC function. The MAC unit 28 includes a pause frame generator 30, a transmission block 32, a remote pause timer 34, a reception block 36, and a reception pause timer 38. The pause frame generator 30 constructs a pause frame based on the pause time information received from the host processor 26 upon receiving the buff_full signal from the packet memory interface 24.

If the buffer of the packet memory 22 is not full, the transmission block 32 transmits the MAC control frame having the packet data read from the packet memory 22 of the common buffer 20 to the upstream Ethernet switches (12-1 to 12-N). If the buffer is full, the transmission block 32 of the downstream Ethernet switch transmits a pause frame to the upstream Ethernet switches (12-1 to 12-N ) to corresponding input port of the Ethernet switches (12-1 to 12-N). In response to the pause frame generated by the pause frame generator 30, the transmission block 32 transmits an activation command signal (RPT_ACT) to activate the remote pause timer 34. The remote pause timer 34 counts the expected pause time period, which represents a period for which the Ethernet switches 12-1 to 12-N will temporarily stop the transmission of data flow. The expected pause time period is determined based on the pause time period indicated in the pause frame, which is generated by the pause frame generator 30. The remote pause timer 34 retrieves information about the expected pause time from the activation command signal and transmits corresponding RPT_CPL signal to the transmission block 32 when the expected pause timer expires. Alternatively, the remote pause timer 34 can receive the expected pause time information from the host processor 26. Then, the transmission block 32 requests the pause frame generator to detect whether the buffer of the packet memory 22 is still in full state. If so, another pause frame is generated to stop the transmission of packet data from the upstream Ethernet switches, and the remote pause timer 34 is initiated again until the congestion condition is cleared.

Now, the working function of the upstream Ethernet switches are described in reference to FIG. 2 since it represents the same working embodiment for both the upstream and the down stream devices. The reception block 36 of the upstream Ethernet switches (12-1 to 12-N) simultaneously receive the MAC control frame transmitted from the Ethernet switch 10. If the pause frame is received, the upstream Ethernet switches stop the transmission of packet data to the downstream Ethernet switch, and the reception block 36 activates the reception pause timer 38, by transmitting an activation command RXT_ACT to the reception pause timer 38 based on the pause time period included in the pause frame. Upon expiration of the pause time period, the reception pause timer 38 transmits a time-out signal RXT_CPL to the transmission block 32 via the reception block 36 of the upstream Ethernet switches (12-1 to 12-N) to restart the transmission of packet data to the downstream Ethernet switch 10.

Now, a more detailed description of the Ethernet switch 10 will be given hereinbelow referring to FIGS. 1, 2, and 3.

The up/down counter of the packet memory interface 24 in the downstream Ethernet switch 10 operating at a full duplex mode, counts up/down upon enqueueing/dequeueing the packet data in/from the packet memory 22. The packet memory interface 24 compares the count value with a predetermined threshold value at every enqueueing/dequeueing operation and transmits a buffer status signal (buf_full) to the frame pause generator 30 of the MAC unit 28 if the buffer becomes full. That is, if the count value is larger than the threshold value, the packet memory interface 24 transmits a buffer status signal, which is set to 1 (buf_full="1"), to the MAC units 28 of the Ethernet switch 10.

Referring to FIG. 3, the pause frame generator 30 in each MAC unit 28 receives the buffer status signal (buf_full) at every enqueueing/dequeueing operation in step 100 and determines whether the packet memory 22 is placed in a buffer-full state using the buffer status signal (buf_full) in step 102. When the buffer full status signal is set to 1 (buf_full="1"), it implies that the packet memory 22 is placed in the buffer-full state and that the Ethernet switch 10 is congested. Then, the pause frame generator 30 constructs a pause frame based on the pause time information received from the host processor 26 during an initialization state, and transmits the pause frame to the transmission block 32, in step 104. The host processor 26 can also transmit the remote pause time information directly to the remote pause timer 34 during the initialization state, namely, when the power is on. The pause frame includes a broadcast address, a pause operation code, and a pause time.

At step 106, the transmission block 32 of the downstream Ethernet switch transmits the pause frame to corresponding upstream Ethernet switches (12-1 to 12-N) through each out port of the MAC unit 28 and activates the remote pause timer 34. The remote pause timer 34 counts the expected pause time period for which the plurality of upstream Ethernet switches (12-1 to 12-N) will stop transmitting the packet data. The remote pause timer 34 is activated by the activation command RPT_ACT of the transmission block 32. The expected pause time is equal to or smaller than the pause time included in the pause frame. Moreover, the host processor 26 can activate the remote pause timer 34 by providing the remote pause time information directly to the remote pause timer 34 during the initialization state. At step 108, it is determined whether the remote pause timer 34 has expired. Then, the remote pause timer 34 transmits the time-out signal RPT_CPL to the transmission block 32 when the expected pause time period is expired.

Upon reception of the time-out signal RPT_CPL, the transmission block 32 notifies the pause frame generator 30 about the expiration of the expected pause time. Then, the pause frame generator 30 again determines whether the packet memory 22 is placed in a buffer-full state, in step 102. That is, after step 108, the MAC unit (28) checks whether the packet memory is in full state again and returns to step 102. If the buffer state is still full, the steps of transmitting the pause frame to each upstream Ethernet switches (12-1 to 12-N) and initiating the expected pause time are executed again until the congestion condition is cleared.

Figure 4:
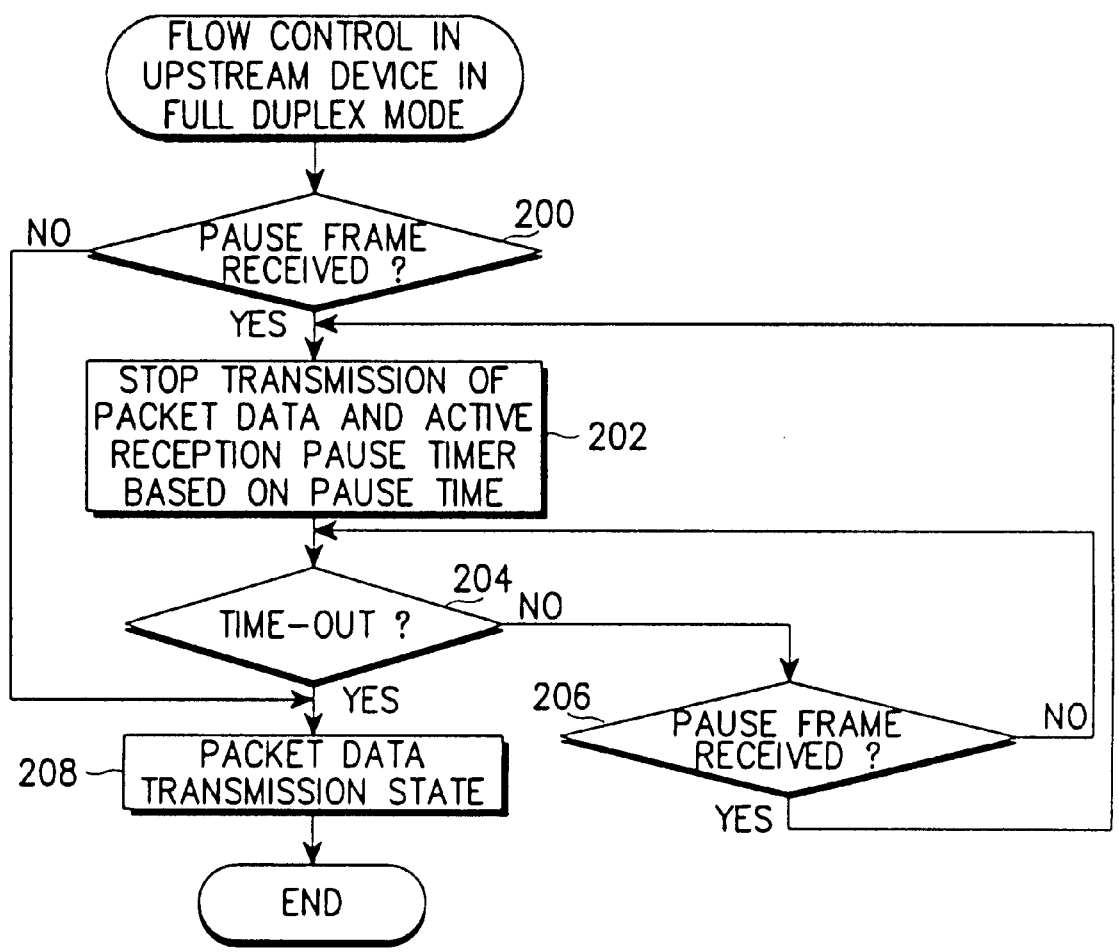
FIG. 4 is a flowchart depicting a flow control operation of an Ethernet switch (upstream) using a full duplex mode according to the first embodiment of the present invention.

Now there will be given a detailed description of a flow control operation in each Ethernet switch 12-1 to 12-N being an upstream device at a full duplex mode, shown in FIG. 4, referring to FIGS. 1, 2, and 4.

At step 200, it is determined whether the reception block 36 of a corresponding MAC unit 28 of each upstream Ethernet switch (12-1 to 12-N) has received the pause frame from the Ethernet switch 10. If the pause frame has been received, the transmission of packet data is stopped, and the reception block 36 activates the reception pause timer 38 based on the pause time included in the pause frame, in step 202. The reception pause timer 38 is activated based on the pause time and the activation command RXT_ACT of the reception block 36. If the reception pause timer 38 has expired, it transmits a time-out signal (RXT_CPL) to the transmission block 32 through the reception block 36, in step 204. At step 208, a packet data transmissible state is entered, and if there is packet data to be transmitted to the Ethernet switch 10, the packet data is transmitted in response to the RXT_CPL signal.

Further, if the reception block 36 in each upstream Ethernet switch does receive another pause frame before receiving the time-out signal (RXT_CPL) in steps 204 and 206, the procedure returns to step 202 to stop the transmission of packet data and the reception pause timer 38 is activated.

In accordance with the first embodiment of the present invention, the packet loss caused by congestion is minimized and a packet processing rate is increased over the entire network. Furthermore, a flow control is facilitated.

Figure 5:
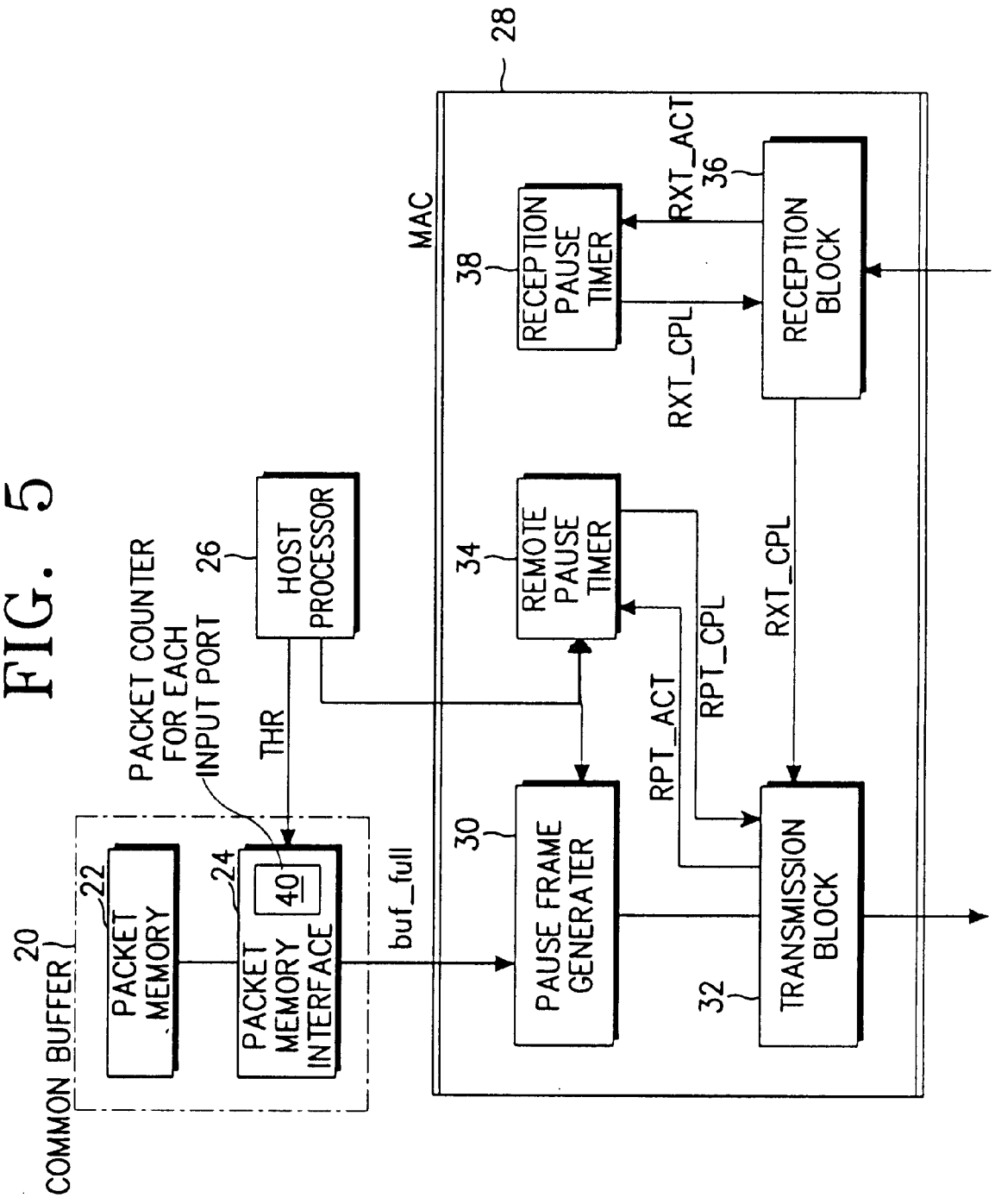
FIG. 5 is a schematic block diagram of an Ethernet switch according to the second embodiment of the present invention.
Figure 6:
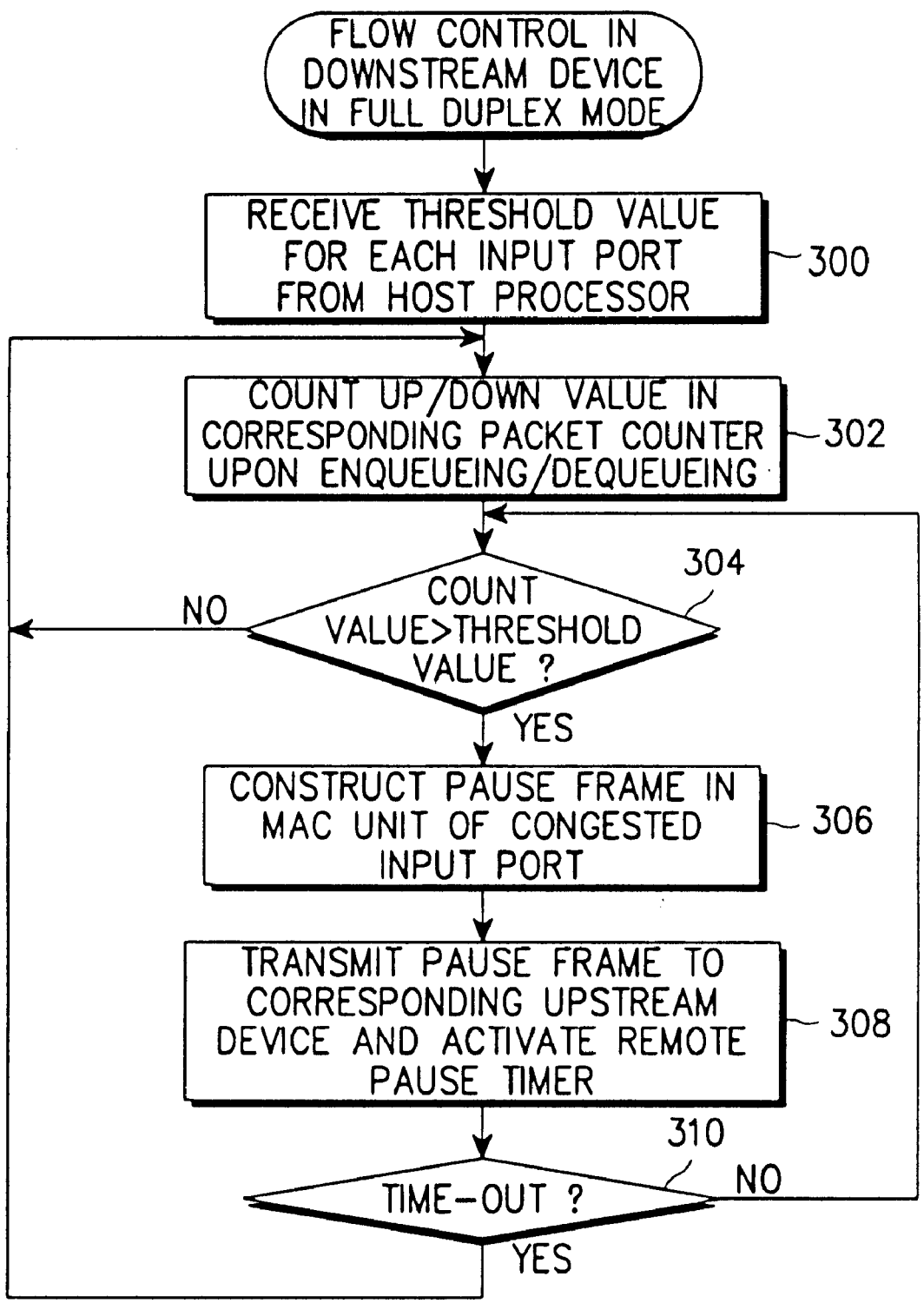
FIG. 6 is a flowchart depicting a flow control operation of an Ethernet switch (downstream) using a full duplex mode according to the second embodiment of the present invention.

FIG. 5 is a block diagram of the Ethernet switch 10 in a full duplex mode according to a second embodiment of the present invention, and FIG. 6 is a flowchart depicting a flow control operation in the Ethernet switch 10 in the full duplex mode according to the second embodiment of the present invention.

In the second embodiment of the present invention, a specific input port causing a congestion in the Ethernet switch 10 is detected and subject to a flow control. That is, after determining a specific input port causing a congestion, the input and the output port of the downstream Ethernet switch causing the congestion is prohibited from receiving and transmitting the packet data, while allowing other input and output ports to receive and transmit the packet data.

The input port causing a congestion (hereinafter referred to as "congested input port") can be detected in the following way. The common buffer 20 of the Ethernet switch 10 maintains a logical queue for each output port because it is an output buffering structure. More specifically, if N represents the number of ports, there are N number of logical queues for the output ports in the common buffer 20. However, the number of packets in the packet memory 22, received through each input port at the time point of a congestion cannot be known, and the identity of the congested input port cannot be determined. To solve this problem in the second embodiment of the present invention, N number of packet counters are provided for each input port to count the numbers of packet data input/output to/from each input port coupled to the downstream Ethernet switch.

Referring to FIGS. 5, the packet memory interface 24 of the common buffer 20 has a plurality of N packet counters 40 for each N input ports for counting up upon storing the packet data received through corresponding input port of the packet memory 22 of the common buffer 20 and for counting down upon reading the packet data from the packet memory 22. If the count value of a specific packet counter exceeds a predetermined threshold value (THR), the Ethernet switch 10 considers that such input port is likely to incur a congestion and performs a flow control. The predetermined threshold value (THR) is provided from the host processor 26, and each THR value for each input port can be same or different depending on how it was set by the operator of the system. Moreover, depending on the traffic characteristics, i.e., traffic burstness, and other multi-environment characteristics, the operator can set different THR value for each input port.

Figure 7:
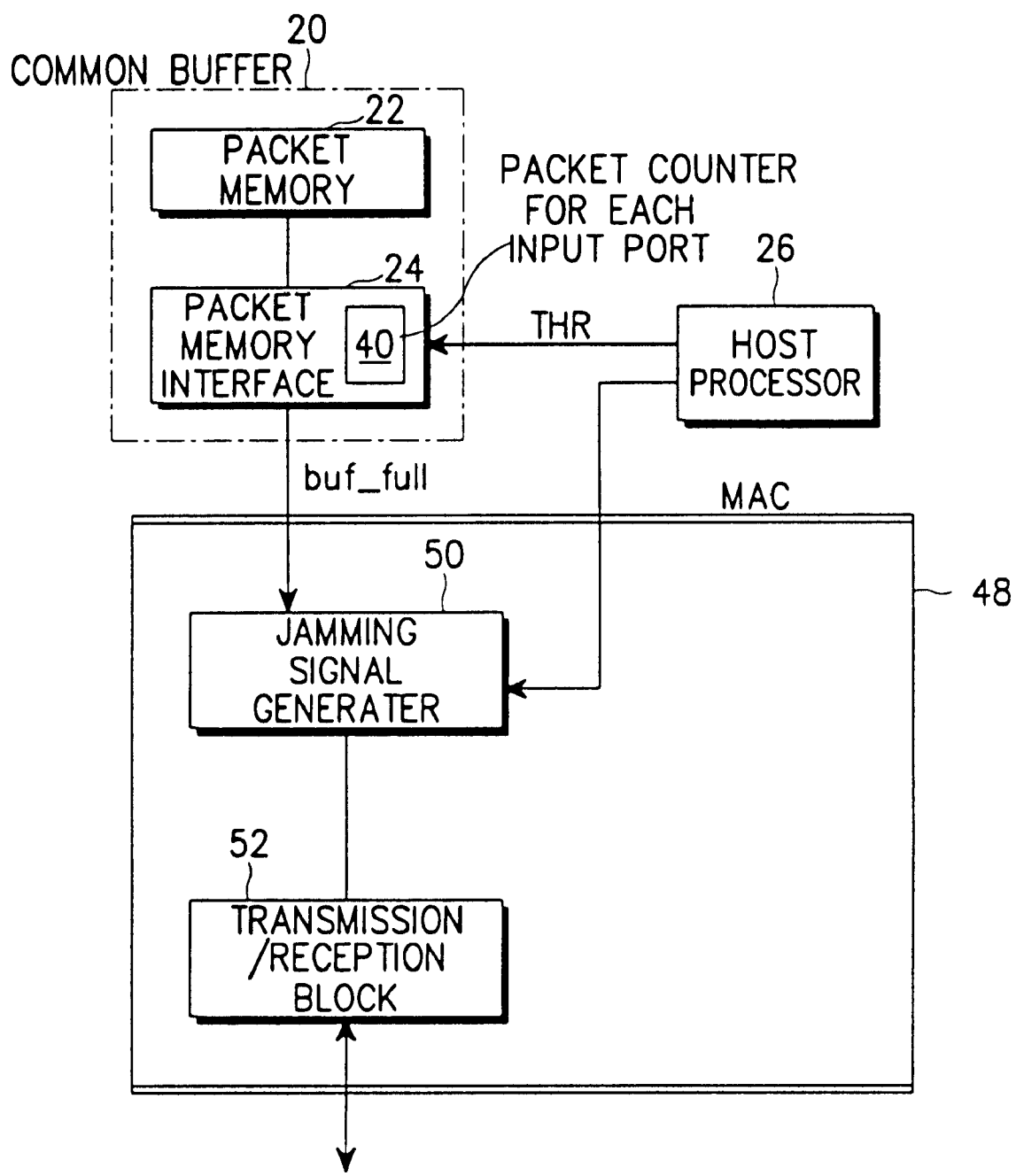
FIG. 7 is a flowchart depicting a flow control operation of an Ethernet (upstream) using the full duplex communication mode according to the second embodiment of the present invention; and, FIG. 8 is a flowchart depicting a flow control operation of the Ethernet switch (downstream) using a half duplex mode according to the second embodiment of the present invention.

A more detailed description of a flow control according to the second embodiment of the present invention will be given hereinbelow. The packet counters 40 for the N input ports count up upon storing the packet data received through corresponding input ports in the packet memory 22, and count down upon outputting the packet data read from the packet memory 22. If the count value of a specific packet counter exceeds a predetermined threshold value (THR), the packet memory interface 24 as shown in FIGS. 5 and 7, transmits a signal indicating that the corresponding input port is congested to the MAC unit 24. Then, the MAC unit 28 performs the flow control only on the congested input port identified by the packet counter 40. The configuration and operation of the MAC unit 28 shown in FIG. 5 are the same as those of the MAC unit 28 of FIG. 2, therefore, its detailed description will be omitted.

In accordance with the second embodiment of the present invention, a congestion condition is prevented in advance and the input ports can fairly share the transmission bandwidth. For example, when the transmission port bandwidth is 10 Mbps for ten ports, the bandwidth of each port can use is 1 Mbps. According to the second embodiment of the present invention, even though the congestion condition occurs in one of the ports, the other ports can operate normally and the packet data can be transmitted using the remaining bandwidth of 9 Mbps while the congested input port goes under the flow control, which was not feasible in the prior art.

FIG. 6 is a flowchart depicting a flow control in the Ethernet switch 10 at a full duplex mode according to the second embodiment of the present invention. Referring to FIG. 6, the Ethernet switch 10 receives a threshold value (THR) for each input port from the host processor 26 during an initialization state, in step 300. Upon enqueueing/dequeueing the packet data to/from the packet memory 22, the corresponding packet counter 40 for each input port performs the counting up/down operation, in step 302. The count value of the packet counter is compared with the preset threshold value (THR) for each input port, in step 304. If the former is larger than the latter, the input port is considered congested and the MAC unit 28 corresponding to the congested input port generates a pause frame, in step 306. The pause frame is constructed by the pause frame generator 30 and transmitted to the transmission block 32. The Ethernet switch 10 transmits the pause frame to the upstream Ethernet switch coupled to the congested input port to stop the transmission of packet data therefrom, and activates the remote pause timer 34 to count the expected pause time, in step 308. The remote pause timer 34 can also directly receive the expected pause time information from the host processor 26. If the remote pause timer 34 has expired in step 310, it is determined whether there is any other congested input port, in step 302. In the presence of other congested input port, another flow control is performed as state above on the newly determined congested input port.

A flow control operation of an upstream device using the full duplex mode according to the second embodiment of the present invention is the same as in the first embodiment of the present invention. Thus, its description is omitted.

FIG. 7 is a block diagram of an Ethernet switch at a half duplex mode according to the second embodiment of the present invention. The components of the Ethernet switch, except for the MAC unit 48, are the same in configuration as those of FIG. 5. The MAC unit 48 includes a jamming signal generator 50 and a transmission/reception block 52.

Figure 8:
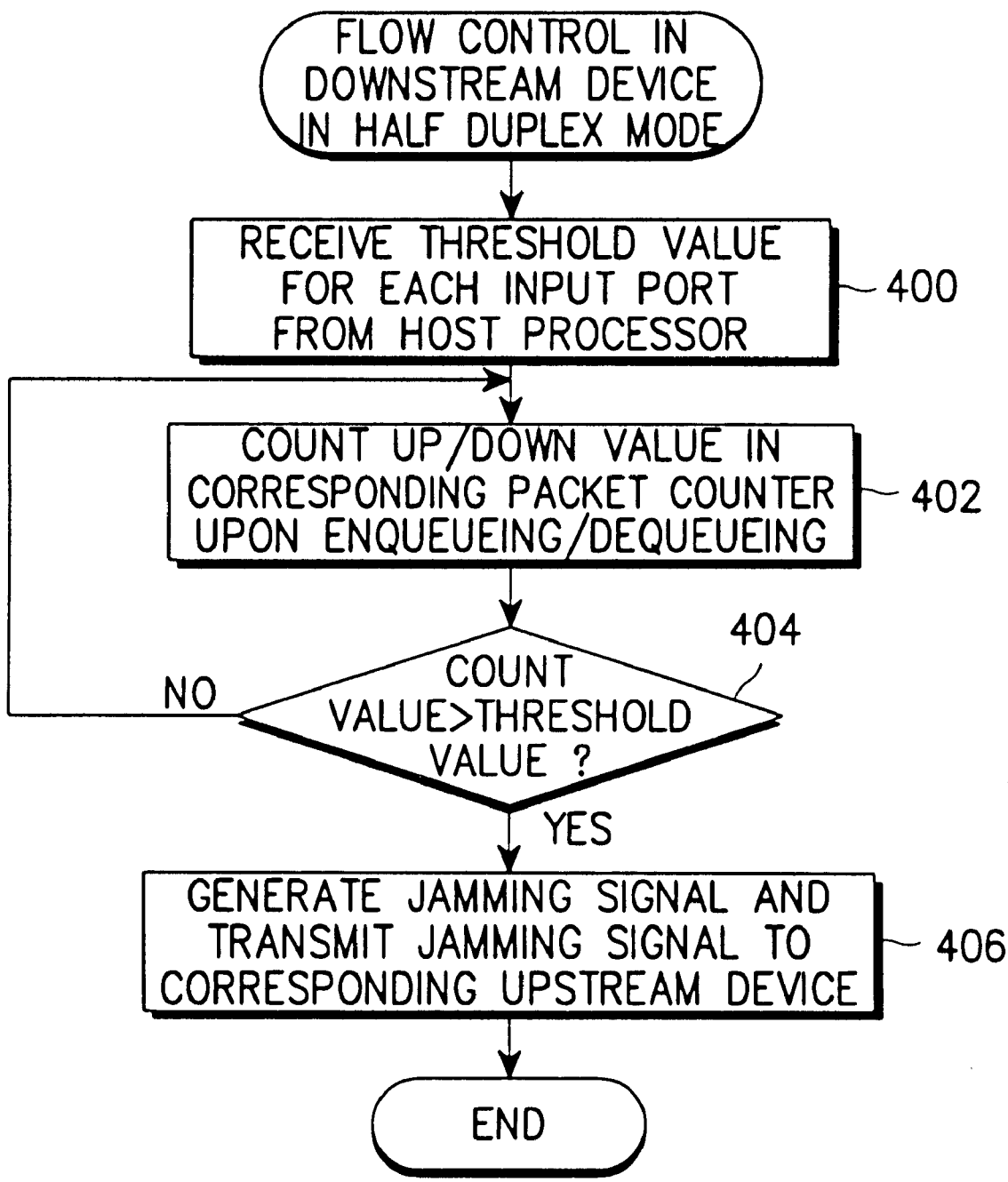

FIG. 8 is a flowchart depicting a flow control operation in the Ethernet switch 10 in a half duplex communication mode according to the second embodiment of the present invention. Referring to FIG. 8, the Ethernet switch 10 receives a threshold value (THR) for each input port from the host processor 26 during an initialization state, in step 400. Upon enqueueing/dequeueing the packet data to/from the packet memory 22, the corresponding packet counter 40 counts up/down operation, in step 402. The count value of each packet counter is compared with the preset threshold value (THR) for each input port, in step 404. If the former is larger than the latter, the input port is considered congested and only the MAC unit 28 for the congested input port generates a jamming signal, in step 406. The jamming signal is generated by the jamming signal generator 50 and transmitted to the transmission/reception block 52. Then, the Ethernet switch 10 transmits the jamming signal via the transmission/reception block 52 to an upstream Ethernet switch coupled to the congested input port, in step 406.

In the second embodiment of the present invention, a specific input port causing a congestion in the Ethernet switch 10 is detected and subject to a flow control, so that transmission of packet data through the congested input port is prohibited, while allowing the upstream Ethernet switches to transmit packet data to the Ethernet switch 10 through other input ports of the Ethernet switch 10 that are not congested.

As described above, the present invention is advantageous in that packet loss caused by a congestion is minimized and a packet processing rate is increased over the entire network. Furthermore, a flow control is facilitated.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a flow of packet data of a downstream Ethernet switch in a full duplex mode in a packet switched network, the downstream Ethernet switch having a plurality of input ports coupled to a plurality of upstream Ethernet switches includes a common memory for storing the packet data received from each input port and for transmitting the packet data read from the common memory to the upstream Ethernet switches, the method comprising the steps of:

determining the buffer state of the common memory for congestion;

transmitting a pause frame having a predetermined pause period to the plurality of upstream Ethernet switches and initiating an expected pause period of the upstream Ethernet switches if the buffer state is full;

determining the buffer state of the common memory again if the expected pause period expires; and, re-transmitting the pause frame having the predetermined pause period to the plurality of upstream Ethernet switches and initiating the expected pause period of the upstream Ethernet switches if the buffer state is full.

2. The method of claim 1, wherein the buffer state is updated every time the packet data is stored or read from the common memory.

3. The method of claim 1, wherein the expected pause period is substantially equal to the predetermined pause period.

4. A method for controlling a flow of packet data of a plurality of upstream Ethernet switches in a full duplex mode of a packet switched network, the method comprising the steps of;

stopping transmission of the packet data to a downstream Ethernet switch for a first pause period upon receiving a first pause frame having the first pause period from a downstream Ethernet switch, and determining whether a second pause frame has been retransmitted from the downstream Ethernet switch.

5. The method of claim 4, the method further comprising the step of stopping transmission of the packet data if the second pause frame is retransmitted from the downstream Ethernet switch.

6. A method for controlling a flow of packet data of a downstream Ethernet switch in a full duplex mode in a packet switched network, the downstream Ethernet switch having a plurality of input ports coupled to a plurality of upstream Ethernet switches includes a common memory for storing packet data received from each input port and for transmitting the packet data read from the common memory to the upstream Ethernet switches, the method comprising the steps of:

determining the buffer state of the common memory for each input port for congestion;

in the event that one of the plurality of input ports is congested, transmitting a first cause frame having a first predetermined pause period to an upstream Ethernet switch coupled to the congested input port and initiating a first expected pause period;

determining the buffer state of the common memory again for each input port if the first expected pause period expires; and, in the event that one of the plurality of input port is congested, transmitting a second pause frame having a second predetermined pause period to an upstream Ethernet switch coupled to the congested input port and initiating a second expected pause period.

7. The method of claim 6, wherein the step of determining the buffer state of the common memory for each input port is performed by a packet counter included in the common memory.

8. The method of claim 6, wherein the step of determining whether each input port is congested is achieved by comparing the buffer state of the common memory for the each input port with a predetermined threshold value for the each input port.

9. The method of claim 8, wherein the threshold value the each input port is substantially equal or different for the each input port depending on traffic characteristics for the each input port.

10. The method of claim 6, wherein the first expected pause period is substantially equal to the first predetermined pause period.

11. A method for controlling a flow of packet data of a downstream Ethernet switch in a full duplex mode in a packet switched network, the downstream Ethernet switch having a plurality of input ports coupled to a plurality of upstream Ethernet switches includes a common memory for storing packet data received from each input port and for transmitting the packet data read from the common memory to the upstream Ethernet switches, the method comprising the steps of:

determining the buffer state of the common memory for each input port for congestion, and transmitting a jamming signal to the upstream Ethernet switch coupled to the congested input port.

12. The method of claim 11, wherein the step of determining the buffer state of the common memory for each input port is performed by a packet counter included in the common memory.

13. The method of claim 11, wherein the step of determining whether each input port is congested is achieved by comparing the buffer state of the common memory for the input port with a predetermined threshold value for the each input port.

14. The method of claim 13, wherein the threshold value the each input port is substantially equal or different for input port depending on traffic characteristics for the each input port.

15. The method of claim 11, wherein the first expected pause period is substantially equal to the first predetermined pause period.

16. An Ethernet switch for transmitting and receiving data to and from other Ethernet switches using a full duplex mode in a packet switched network, said Ethernet switch comprising:

a common buffer that includes a packet memory for storing packets, the common buffer further including a plurality of input ports and, for each input port, a respective packet counter associated with packets received via the input port;

a pause frame generator for generating a pause frame that includes pause time information for stopping transmission of packets for a predetermined time period; and a host processor for determining whether a count value of at least one of the packet counters exceeds a predetermined packet threshold and, if the threshold is exceeded, controlling the pause frame generator to transmit the pause frame to an Ethernet switch corresponding to an input port for which the threshold is exceeded.

17. The Ethernet switch of claim 16, further comprising:

a remote pause timer; and if, after the generator transmits the pause frame, a count of the timer exceeds a predetermined time threshold, determining, upon a change in the count value of the packet counter for said input port for which the threshold is exceeded, whether a current count produced by said change exceeds the packet threshold.

18. An Ethernet switch for transmitting and receiving data to and from other Ethernet switches using a full duplex mode in a packet switched network, said Ethernet switch comprising:

a common buffer that includes a packet memory for storing packets, the common buffer further including a plurality of input ports, each of the plural input ports being provided with a respective packet counter for counting up for packets that are input into the packet memory via the input port and counting down for packets that are output from the memory;

a pause frame generator for generating a pause frame that includes pause time information for stopping transmission of packets for a predetermined time period; and a host processor for determining whether a count value of at least one of the packet counters exceeds a predetermined packet threshold and, if the threshold is exceeded, controlling the pause frame generator to transmit the pause frame to an Ethernet switch corresponding to an input port for which the threshold is exceeded.

19. The Ethernet switch of claim 18, further comprising:

a remote pause timer; and if, after the generator transmits the pause frame, a count of the timer exceeds a predetermined time threshold, determining, upon a change in the count value of the packet counter for said input port for which the threshold is exceeded, whether a current count produced by said change exceeds the packet threshold.

20. An Ethernet switch for transmitting and receiving data to and from other Ethernet switches using a full duplex mode in a packet switched network, said Ethernet switch comprising:

a common buffer that includes a packet memory for storing packets, the common buffer further including a plurality of input ports, each of the plural input ports being provided with a respective packet counter for counting up for packets that are input into the packet memory via the input port and counting down for packets that are output from the memory;

a jamming signal generator for generating a jamming signal for stopping transmission of packets; and a host processor for determining whether a count value of at least one of the packet counters exceeds a predetermined packet threshold and, if the threshold is exceeded, controlling the jamming signal generator to transmit the jamming signal to an Ethernet switch corresponding to an input port for which the threshold is exceeded.

* * * * *